Dec. 6, 1960 J. BICHE ET AL 2,962,756
MACHINES FOR FURNISHING ELECTRIC WIRES WITH
A MULTI-COLORED PLASTIC COVERING
Filed Sept. 26, 1957 6 Sheets-Sheet 5
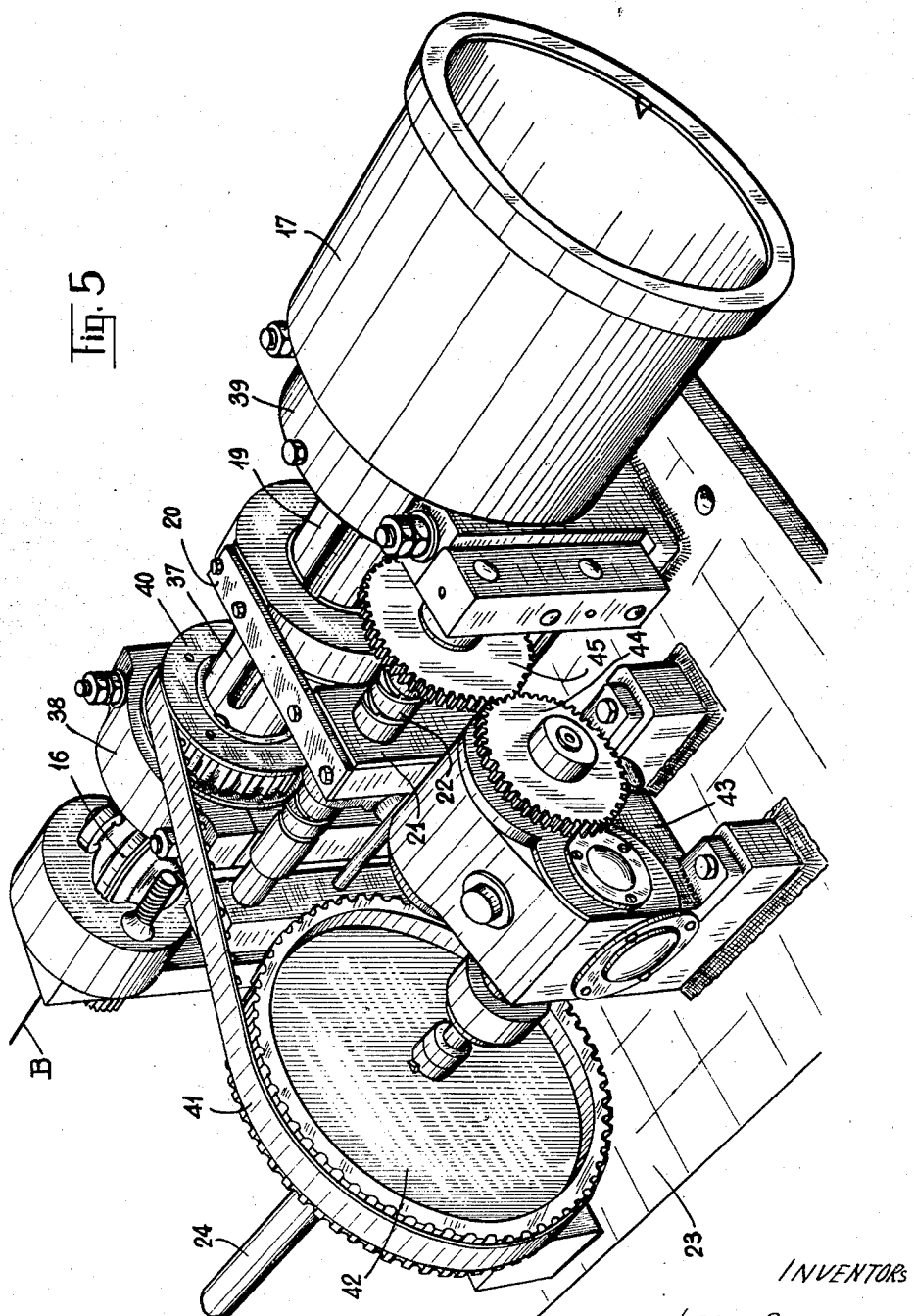
INVENTORS
JEAN BICHE
LÉON ANDOUART
ATTY.

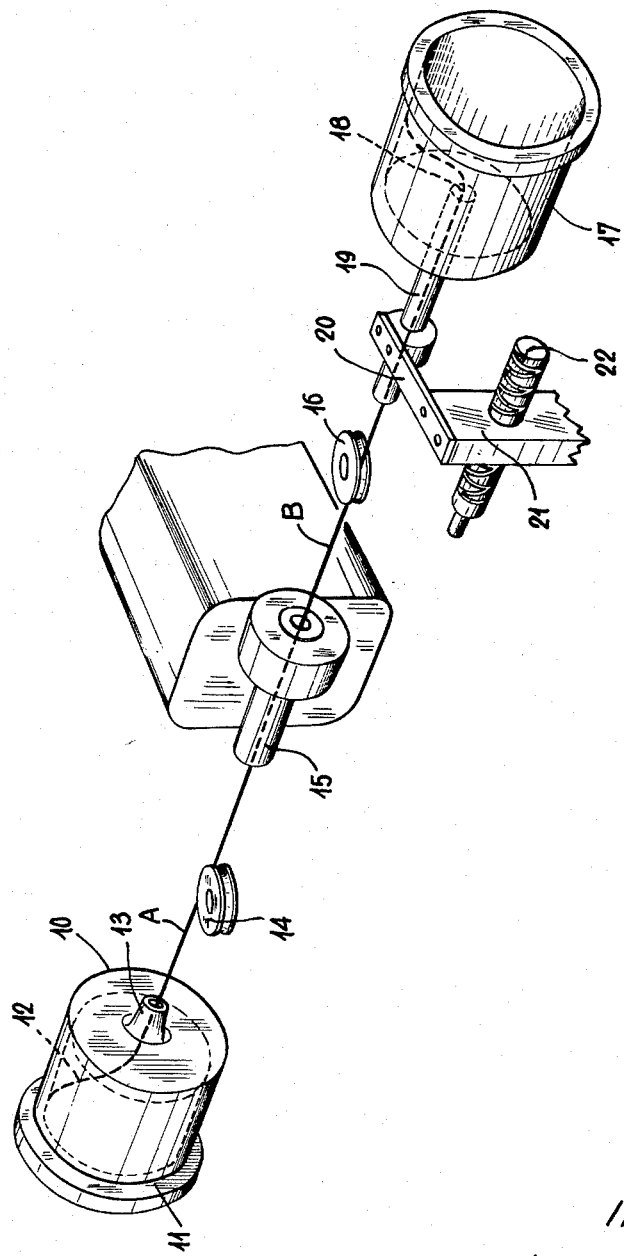

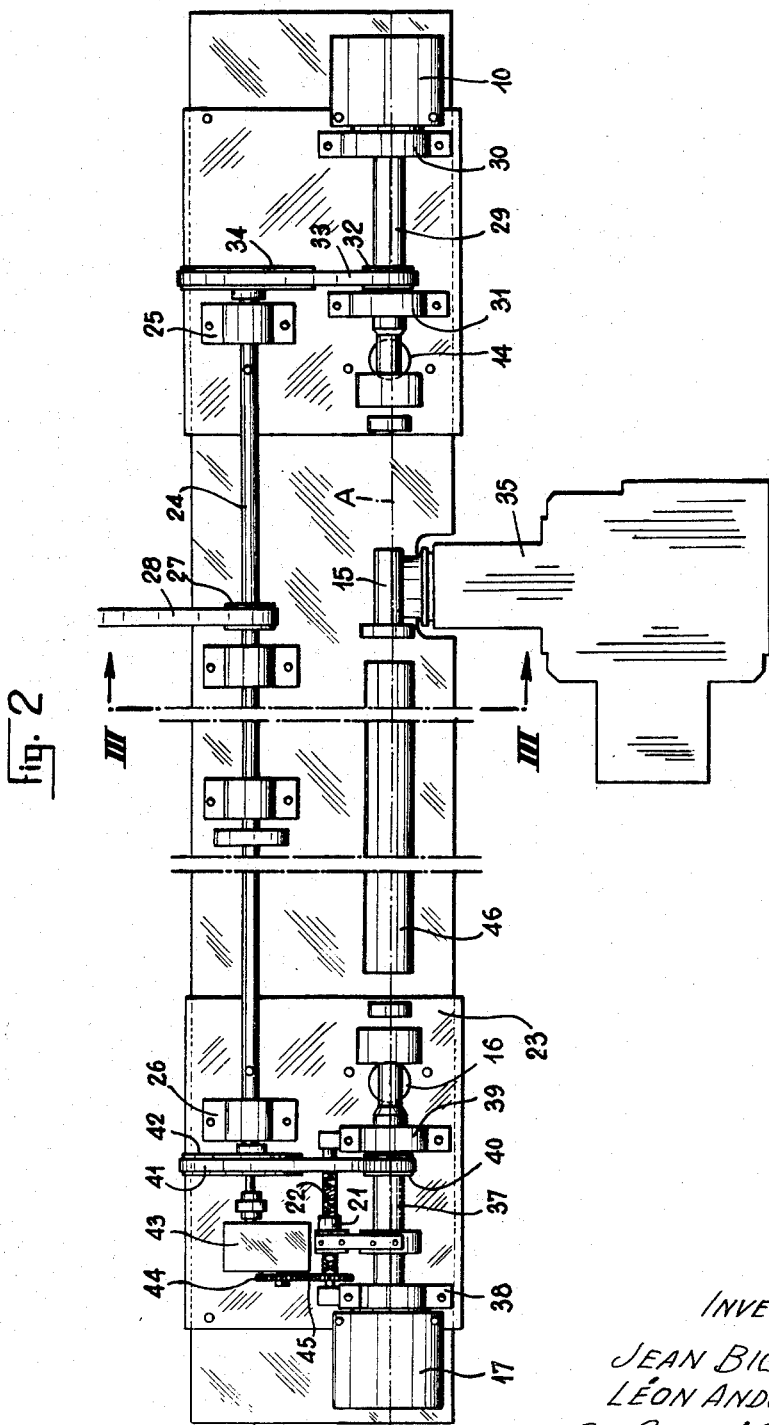

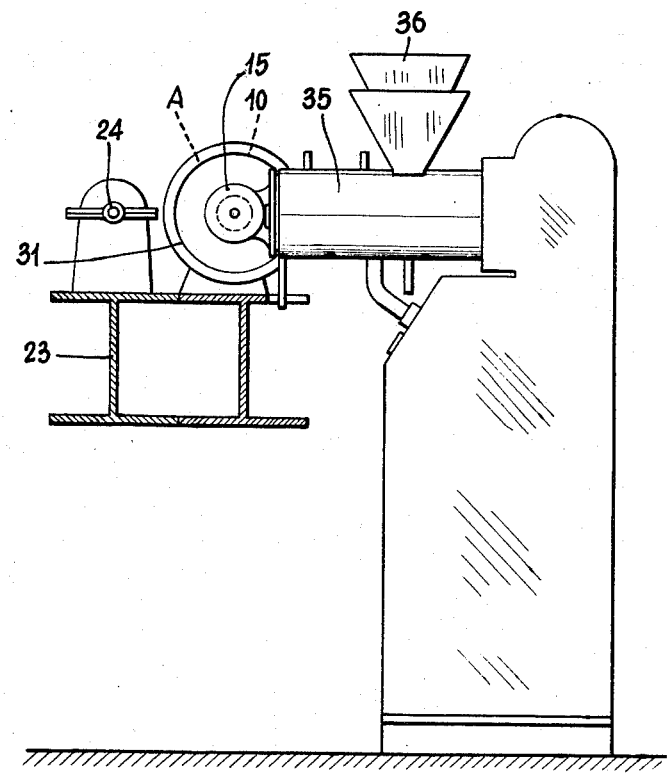

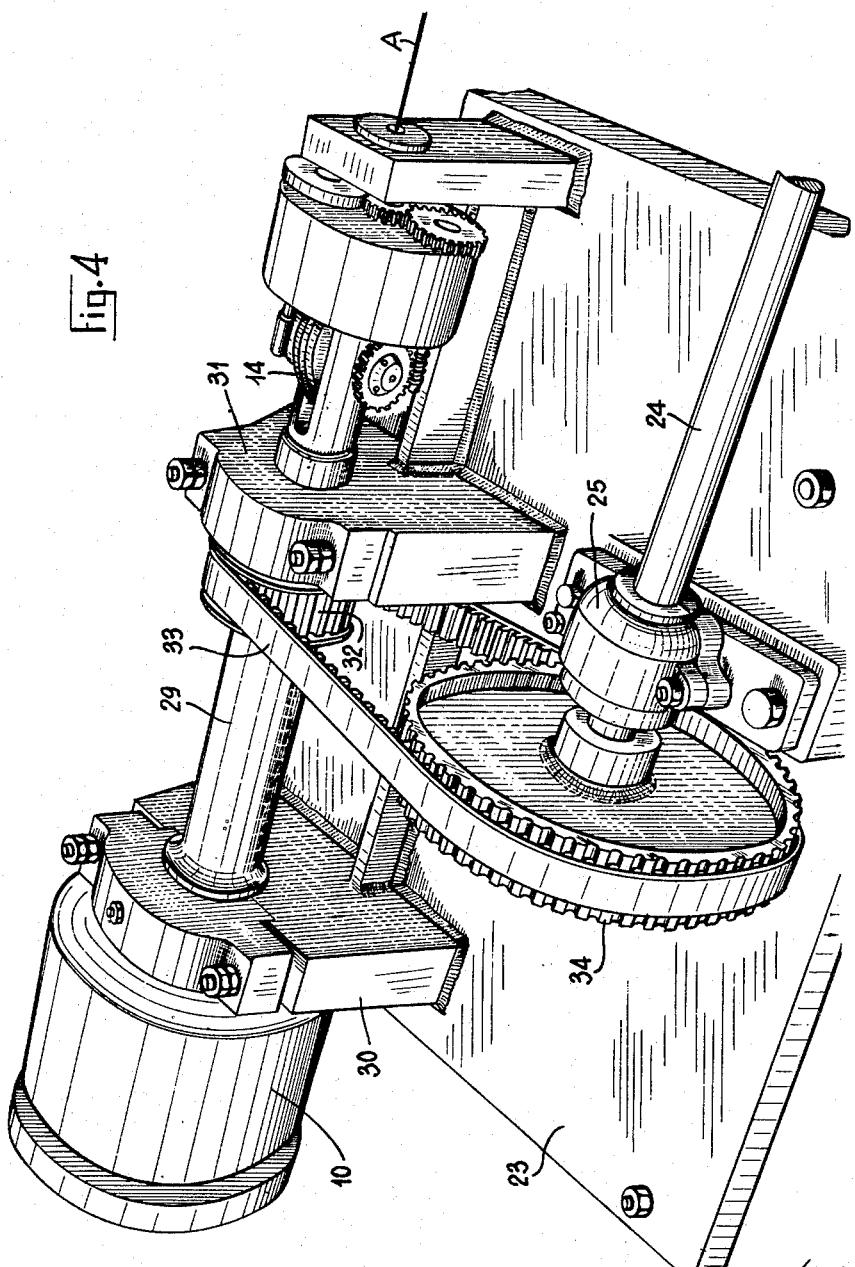

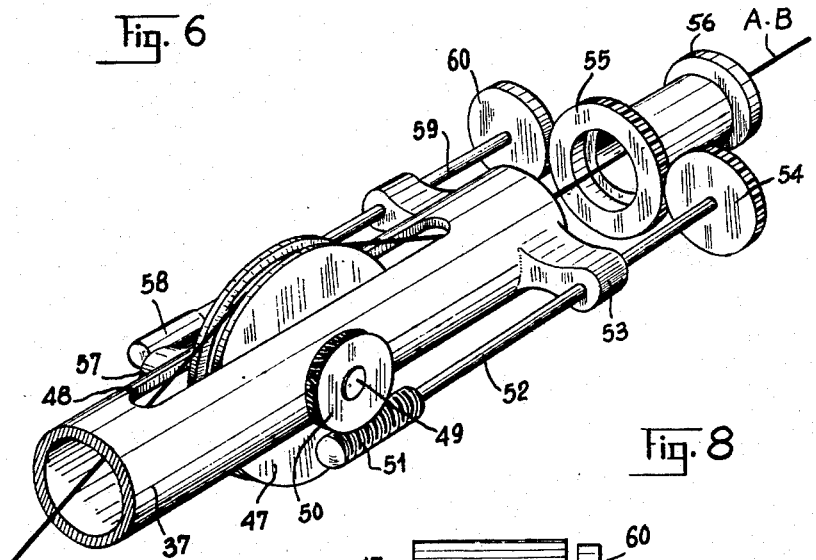
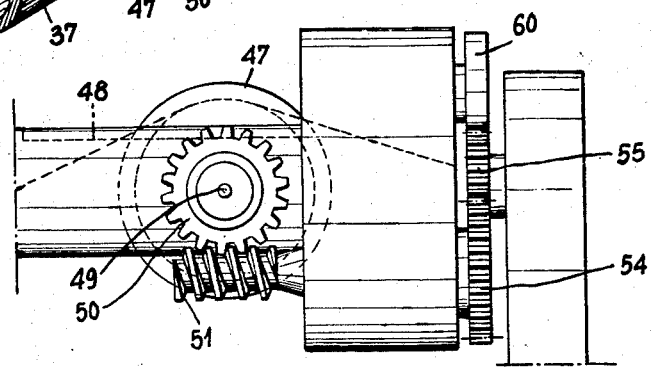
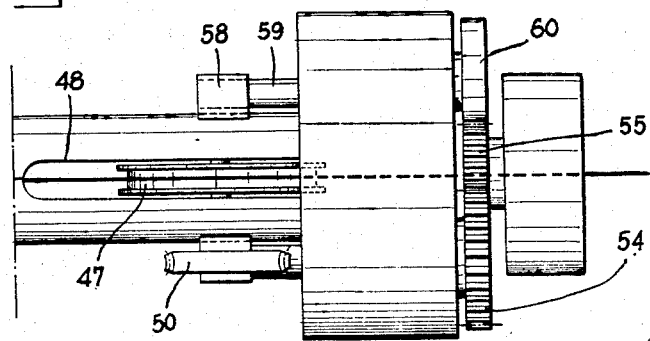

United States Patent Office 2,962,756
Patented Dec. 6, 1960

2,962,756

MACHINES FOR FURNISHING ELECTRIC WIRES WITH A MULTI-COLORED PLASTIC COVERING

Jean Biche and Léon Andouart, Paris, France; said Biche assignor to Le Materiel de Cablerie, Courbevoie, France, a corporation of France Filed Sept. 26, 1957, Ser. No. 686,494

Claims priority, application France May 22, 1957

5 Claims. (Cl. 18—13)

This invention relates to a machine for furnishing electric wires with a helically multi-colored plastic covering.

In electric installations, for example telephone installations, which necessitate a large number of wires, it is usual, for the purpose of distinguishing between these wires, to furnish the same with coverings in different colors. Naturally, only different combinations of colors satisfy this purpose, and in order that the colors may be observed in any position of the wire, it is desirable that the colored lines should be disposed about the wire in helical form.

A convenient and economical method of obtaining coverings of this nature is to execute the same in plastic material. In order to form helical tapes in different colors the wire is passed through the head of an extruding machine arranged to supply simultaneously materials of different colors. At the same time there is imparted to the wire a rotary movement in relation to the head and a continuous rectilinear movement of translation for the purpose of obtaining the desired helical pitch.

The rotary movement may be obtained by rotating the head or the whole of the extruder about the wire, the latter being subjected to a simple linear shifting movement. This solution, however, results in comparatively serious complications and has been very little used.

It would appear preferable to allow the extruder to remain stationary, and to impart to the wire a double movement of rotation and of translation. In this way the machine comprises of necessity on either side of the extruder a supply means ad a receiving means rotating at the same speed.

The most straightforward method of providing the rotary supply means and receiving means is to form the same on reels of the usual kind mounted on supports rotating synchronously about the longitudinal axis resulting from the winding off of the wire. Machines thus formed operate correctly, but their output is limited.

In actual fact the mounting of the reels presents problems in the matter of equilibrium which are difficult to solve. In practice, for the purpose of avoiding dangerous vibrations, it is necessary to limit the speed of rotation. In consequence the linear winding off of the wire, and accordingly the output, is likewise restricted to well below the possibilities of the extruding machine. The output on the part of such machines is comparatively small.

The present invention has for its object, while avoiding these drawbacks, permitting better utilization of the possibilities of the extruder and allowing a much greater speed of rotation of the wire than that which is possible in the case of reel winding machines.

It consists in constructing the supply and receiving means in respect of the wire in the form of containers or drums rotating in synchronized fashion about their axis, which is identical with the winding off axis of the wire. The supply drum receives a coil of uncovered wire, which is unwound from the inside. The wire thereupon passes out along the axis of the drum to enter the head of the extruding machine. In symmetrical fashion the wire furnished with the insulating covering enters the receiving drum along the axis of rotation and is formed into a coil in the interior by centrifugal action, the laying of the individual turns being ensured by means of a traversing device.

With this arrangement there is readily obtained perfect equilibrium of the rotary elements, and incomparably higher rates of rotation are achieved than in the case of reeling machines. Thus it is that speeds of 5000 revolutions per minute or more may be achieved without dangerous vibrations, corresponding to an output of wire amounting to several tens of meters per minute, i.e., speeds and outputs which are incapable of being obtained with ordinary reeling machines of the usual known kind.

It is, therefore, by substitution of the reels by rotary drums or containers and the use of coils of wire in place of reels that the invention is essentially characterized. The coils of wire may be formed in any manner as desired.

In order to ensure the winding off of the naked wire and also its advance towards the receiving drum there is associated with each of the supply or receiving drums, or at least with the receiving drum, a capstan, which is set into rotation with the said drums and is actuated by a mechanism likewise operated by rotation of the whole.

According to a particularly advantageous form of embodiment, the capstan is actuated by a wheel and a worm driven by a pinion acting in planetary fashion about a fixed pinion mounted about the general axis of the machine, which is the direction of winding off of the wire. This driving mechanism for the capstan is balanced in order not to produce any vibration upon its rapid rotation.

In order that the invention may be more readily understood, an embodiment thereof will now be described, by way of example, with reference to the accompanying drawings, in which:

Fig. 1 is a diagrammatical perspective view of the machine as a whole.

Fig. 2 is a plan view.

Fig. 3 is a view in elevation.

Fig. 4 is a perspective view of the supply means for the uncovered wire.

Fig. 5 is a perspective view showing the device for receiving the covered wire.

Fig. 6 is a complete view of a capstan drawing on the wire.

Fig. 7 is a plan view of the capstan according to Fig. 6, and

Fig. 8 is an elevational view corresponding to Fig. 7.

The machine according to the invention has the object of ensuring the provision of a wire A with an insulating covering composed of a plastic material in a plurality of colors, disposed helically, the wire thus covered being indicated at B. In order to form this covering the wire A essentially has a longitudinal displacement and, at the same time, a rotary movement imparted thereto, the rotation being linked up with the movement of translation for the purpose of obtaining the helical pitch of the multicolored covering.

As will be seen diagrammatically in Fig. 1, the wire A is supplied by a drum 10 containing a coil 11 which is wound off through the interior at 12. The wire leaves the drum 10 through the orifice 13 and is drawn along as required by the capstan 10. The assembly comprising drum 10 and capstan 14, and in consequence the wire A, is set into rotation at a high speed. The wire then passes into the head of the fixed extruder 15, where it receives the plastic material comprising a plurality of alternating colors. In consequence of the simultaneous movement of translation and that of rotation the plastic material is made to cover the wire along helical lines.

The wire B thus coated is drawn along by the capstan 16 and is then received in a drum 17. In order to ensure a properly formed coil 18 in the drum 17 the wire advanced by the capstan is disposed in parallel turns to form a coil by means of a traversing device constituted by a tube 19 having a reciprocatory motion imparted thereto by any suitable means, for example by a bar 20 connected to a threaded ring 21 actuated by the rod 22 furnished with a double thread.

The drum 17 and the capstan 16 are set into rotation in synchronization with the drum 10 and the capstan 14. It is to be noted that the path of the wire at A and B is disposed along the axis of rotation of the rotary elements 10 and 17.

In their practical embodiment (Figs. 2-5) the different parts above referred to are mounted on a support 23. On this support 23 there is also provided a transmission shaft 24 parallel to the axis of rotation of the drums, along which the wire A—B is caused to be displaced. The shaft 24, supported by bearings 25 and 26, receives its motion in any appropriate fashion at 27, for example by the belt 28 driven by a motor (not shown) through a variable gear.

The drum 10 is rigid with a hollow shaft 29 supported by bearings 30 and 31, and it is set into rotation by the gear wheel 32 actuated by a grooved belt 33, which in turn is driven by the gear wheel 34 mounted on the shaft 24. The end of the shaft 29 may, if desired, carry the rotary capstan 14.

The axis of the head of the extruder 15 is located in the direction of the wire A, which also represents the axis of rotation of the drums 10 and 17. This head is mounted on the extruding machine 35 having multiple feeding means at 36 (Fig. 3) for plastic material in a plurality of colors.

The drum 17 is rigid with a hollow shaft 37 supported by the bearings 38 and 39. The shaft carries at 40 a driving wheel operated by a grooved belt 41, which in turn is actuated by the wheel 42 mounted on the shaft 24. The shaft 37 carries at its end the rotary capstan 16.

The shaft 24 drives a reducing gear 43, which by way of the pinions 44, 45 causes rotation of the double-threaded screw 22 actuating the coil-laying means 20—21.

Between the head 15 and the capstan 16 there may be provided a cooling through 46 for the plastic material with which the wire is covered, ensuring solidification thereof prior to its reception in the drum 17.

The capstans 14 or 16 (Figs. 6 to 8) are constituted by a grooved pulley 47 located in a recess 48 in the end of the hollow shaft (29 or 37). The spindle 49 in respect of the pulley is mounted on this hollow shaft to be perpendicular to the general axis of rotation of the machine.

On the spindle 49 there is mounted a wheel 50 meshing with the worm 51. The latter is carried by a shaft 52, which is mounted at 53 on the hollow shaft 37 (or 29) and is actuated by a pinion 54. The pinion 54 plays the part of a planetary member about the fixed pinion 55, the axis of which coincides with the general axis of the machine. The pinion 55 is held by the flange 56 on a bearing or any other fixed part of the machine.

With this arrangement the pulley 47 of the capstan set into rotation by the mechanism comprising the pinion and the worm brings about an axial winding off of the wire at a speed which is in relation to the rotation of the hollow shaft assembly 29. There results in respect of the wire a helical movement, the pitch of which is predetermined.

The assembly which has just been described, with exception of the pinion 55, rotates at high speed, and a balancing thereof is indispensable. For this purpose there are provided at 57, 58, 59 and 60 counterparts in respect of the parts 50, 51, 52 and 54. These counterparts, however, do not require to be put into engagement and to transmit motion. They are constituted by massive elements having neither teeth nor threads.

What we claim is:

1. A machine for coating wires with a helicoidal multi-colored coating of plastic material which comprises two spaced chambers, each adapted to house a coil of wire, mounted for rotation about the same axis, an aperture in the end of each chamber facing the other chamber and positioned on said axis, means adjacent one of the chambers and rotatable about said axis for longitudinally moving a wire from a coil housed in one of said chambers through the aperture thereof to and through the aperture in the other chamber, means for rotating said chambers and said means for longitudinally moving the wire in unison, and a stationary extruding machine provided with a fixed nozzle positioned on said axis, whereby the wire is moved longitudinally from said one chamber through the nozzle and into the other chamber and simultaneously rotated bodily during said movement.

2. In a machine for coating wires with a helicoidal multi-colored coating of plastic material by means of a stationary extruding machine provided with a stationary nozzle comprising two spaced chambers mounted for rotation about the same axis, an aperture in the end of each chamber facing the other chamber, rotatable means located between the two chambers for longitudinally moving a wire from a coil located in one chamber through the aperture in said chamber to and through the aperture into the other chamber, and means for rotating said chambers and said rotatable means in unison, whereby the wire is bodily rotated during its longitudinal movement from one chamber to the other.

3. A machine for longitudinally moving and bodily rotating a wire which comprises two spaced chambers mounted for rotation about the same axis, an aperture in the end of each chamber facing the other chamber, rotatable means located between the two chambers for longitudinally moving a wire from a coil located in one chamber through the aperture in said chamber to and through the aperture into the other chamber, and means for rotating said chambers and said rotatable means in unison, whereby the wire is bodily rotated during its longitudinal movement from one chamber to the other.

4. A machine as recited in claim 3 wherein the rotatable means for longitudinally moving a wire comprises a balanced capstan mounted adjacent each chamber for rotation about the axis of rotation of said chambers and about an axis normal to said first-mentioned axis.

5. A machine as recited in claim 3 including guide means positioned adjacent said other chamber for guiding the wire through the aperture thereof, and means for imparting a to-and-fro movement to said guide means to facilitate coiling of the wire as it enters said other chamber.

References Cited in the file of this patent

UNITED STATES PATENTS

| 1,407,175 | Smith | Feb. 21, 1922 |
| 2,610,607 | Isenberg | Sept. 16, 1952 |
| 2,722,729 | Wilhelm | Nov. 8, 1955 |

FOREIGN PATENTS

| 201,122 | Australia | Mar. 1, 1956 |
| 910,430 | Germany | Mar. 25, 1954 |